(12) United States Patent
Chang et al.

(10) Patent No.: US 10,914,885 B2
(45) Date of Patent: Feb. 9, 2021

(54) BACKLIGHT MODULE HAVING A LIGHTGUIDE PLATE WITH OPTICAL STRUCTURES AND DISPLAY DEVICE

(71) Applicants: Radiant(Guangzhou) Opto-Electronics Co., Ltd, Guangdong (CN); Radiant Opto-Electronics Corporation, Kaohsiung (TW)

(72) Inventors: Chia-Yin Chang, Kaohsiung (TW); Chin-Ting Weng, Kaohsiung (TW); Hao Chen, Kaohsiung (TW); Yi-Ching Chung, Kaohsiung (TW)

(73) Assignees: Radiant(Guangzhou) Opto-Electronics Co., Ltd, Guangdong (CN); Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 16/671,178

(22) Filed: Nov. 1, 2019

(65) Prior Publication Data

US 2020/0064536 A1 Feb. 27, 2020

Related U.S. Application Data

(63) Continuation of application No. PCT/CN2018/098938, filed on Aug. 6, 2018.

(51) Int. Cl.
*F21V 8/00* (2006.01)

(52) U.S. Cl.
CPC .......... *G02B 6/0045* (2013.01); *G02B 6/0053* (2013.01)

(58) Field of Classification Search
CPC ... G02B 6/0045; G02B 6/0053; G02B 6/0038
See application file for complete search history.

(56) References Cited

U.S. PATENT DOCUMENTS

| 5,485,291 A | 1/1996 | Qiao et al. |
| 2007/0030698 A1* | 2/2007 | Miyashita ............ G02B 6/0038 |
| | | 362/626 |

(Continued)

FOREIGN PATENT DOCUMENTS

| CN | 104714269 A | 6/2015 |
| CN | 105572788 A | 5/2016 |

(Continued)

*Primary Examiner* — Tracie Y Green
(74) *Attorney, Agent, or Firm* — CKC & Partners Co., LLC

(57) ABSTRACT

A light guide plate, a backlight module and a display device are provided. The light guide plate includes a main body and optical structures. The main body has a light-incident surface, an opposite light-incident surface, and an optical surface. The optical structures are disposed on the optical surface. Each of the optical structures has a first optical active surface and a second optical active surface, and the first optical active surface and the second optical active surface are inclined towards different directions and formed in a non-symmetrical shape. A first inclined angle is formed between the first optical active surface and the optical surface. A second inclined angle is formed between the second optical active surface and the optical surface. The first included angle is greater than the second included angle, and a light-emitting angle of the light guide plate decreases exponentially with the first inclined angle.

12 Claims, 13 Drawing Sheets

(56) References Cited

U.S. PATENT DOCUMENTS

| | | | | |
|---|---|---|---|---|
| 2007/0177405 A1* | 8/2007 | Chan | .................... | G02B 6/002 |
| | | | | 362/613 |
| 2013/0286679 A1* | 10/2013 | Chen | .................... | G02B 6/0053 |
| | | | | 362/607 |
| 2013/0336005 A1* | 12/2013 | Chen | .................... | G02B 6/0043 |
| | | | | 362/611 |
| 2019/0129086 A1* | 5/2019 | Chang | .................... | G02B 6/0015 |
| 2020/0225403 A1* | 7/2020 | Chang | .................... | G02B 6/0053 |

FOREIGN PATENT DOCUMENTS

| | | |
|---|---|---|
| CN | 207502767 U | 6/2018 |
| EP | 1992870 A2 | 11/2008 |
| TW | I490565 B | 7/2015 |
| WO | 2015034896 A1 | 3/2015 |

\* cited by examiner

BACKLIGHT MODULE HAVING A LIGHTGUIDE PLATE WITH OPTICAL STRUCTURES AND DISPLAY DEVICE

RELATED APPLICATIONS

This application is a continuation application of International Application No. PCT/CN2018/098938 filed on Aug. 6, 2018, which is incorporated herein by reference.

BACKGROUND

Field of Invention

The present invention relates to a light guide element and its application. More particularly, the present invention relates to a light guide plate and its applications in a backlight module and a display device.

Description of Related Art

Referring to FIG. 1A, FIG. 1A is a schematic diagram showing a conventional backlight module 100. The conventional backlight module 100 includes a light source 110 and a light guide plate 120. The light guide plate 120 has a light-incident surface 121, an opposite light-incident surface 122, and a reflecting surface 123. The light-incident surface 121 is opposite to the opposite light-incident surface 122, and the reflecting surface 123 is connected to the light-incident surface 121 and the opposite light-incident surface 122.

In order to reflect light, plural microstructures 124 are disposed on the reflecting surface 123, and each of the microstructures 124 is a non-symmetrical triangle when viewed from its side. Each of the microstructures 124 has a first surface 124a and a second surface 124b, and there is a first included angle α1 between the first surface 124a and the reflecting surface 123, and there is a second included angle β1 between the second surface 124b and the reflecting surface 123. In order to increase the reflection of a light beam L1 emitted from the light source 110, the first included angle α1 is generally designed to be ranging from 40-60 degrees, and the area of the second surface 124b is designed to be greater.

However, when a portion of light propagates to the opposite light-incident surface 122, the light will be reflected by the opposite light-incident surface 122 to propagate toward the light-incident surface 121 (such as a light beam L2). When the light beam L2 is emitted toward the first surface 124a, it may be formed a diffusing light passing through the first surface 124a. Simultaneously referring to FIG. 1B, FIG. 1B a schematic diagram showing a relationship between a light-emitting angle and light-emitting energy generated from the conventional backlight module. It can be seen from FIG. 1B that, a portion of light generated from the light source 110 propagates to the opposite light-incident surface 122, the light will be reflected by the second surfaces 124b of the microstructures 124 to propagate toward a light-emitting surface of the light guide plate 120 so as to form a light beam with 60-90 degrees angle along +Y direction. On the other hand, after the light beam L2 reflected by the opposite light-incident surface 122 emits toward the first surface 124a of the microstructures 124, there are no light-emitting energy shown on a light emitting surface of the light guide plate 120 along −Y direction, which means that the light beam L2 reflected by the opposite light-incident surface 122 which emits toward the first surface 124a may directly pass through of the light guide plate 120 from the first surface 124a, thus resulting the loss of a portion of available light. If there is a portion of light reflected by the first surface 124a and exiting from the light emitting surface, the viewing angle of the backlight module 100 will be quite messy. As shown in FIG. 1B, there is a small amount of non-concentrated light-emitting energy at light-emitting angle of −30 to −90 degrees. If a turning film is applied to the backlight module 100, because only specific light-emitting angles emitted from the light guide plate can be used by the turning film, most of the light reflected by the first surface 124a cannot be used by the turning film, thus resulting energy loss.

SUMMARY

One object of the present invention is to provide a light guide plate, a backlight module and a display device, in which optical structures of the light guide plate can increase utilization rate of light.

According to the aforementioned object, a light guide plate is provided. The light guide plate is suitable to guide light beam generated from a light source and includes a main body and plural optical structures. The main body has a light-incident surface, an opposite light-incident surface, and an optical surface, in which the light-incident surface is opposite to the opposite light-incident surface, and the optical surface is connected to the light-incident surface and the opposite light-incident surface, and the light-incident surface faces toward the light source. The optical structures are disposed on the optical surface, in which each of the optical structures has a first optical active surface and a second optical active surface, and the first optical active surface faces toward the light-incident surface, and the second optical active surface faces toward the opposite light-incident surface. The first optical active surface and the second optical active surface are inclined towards different directions (e.g. inclined relative to opposite sides) and formed in a non-symmetrical shape. A first inclined angle is formed between the first optical active surface and the optical surface, and a second inclined angle is formed between the second optical active surface and the optical surface. The first included angle is greater than the second included angle, and the second included angle is greater than 0 degree, and a light-emitting angle of the light guide plate decreases exponentially with the first inclined angle.

According to an embodiment of the present invention, the first included angle is smaller than or equal to 10 degrees and is greater than or equal to 2 degrees, and the first included angle is greater than or equal to twice of the second included angle.

According to an embodiment of the present invention, the first included angle is in a range which is greater than or equal to twice of the second included angle and smaller than 8 times of the second included angle.

According to an embodiment of the present invention, the relationship between the light-emitting angle and the first included angle can be expressed as: φ=A+B×Exp(−α/C), wherein φ is the light-emitting angle, a is the first included angle, and 62≤A≤65, 85≤B+A≤90, 2≤C≤3.

According to the aforementioned object, a backlight module is provided. The backlight module includes a light source, a light guide plate and a prism film. The light guide plate is suitable to guide a light beam generated from a light source and includes a main body and plural optical structures. The main body has a light-incident surface, an opposite light-incident surface, and an optical surface, in which the light-incident surface is opposite to the opposite light-incident surface, and the optical surface is connected to the light-incident surface and the opposite light-incident surface, and the light-incident surface faces toward the light source. The optical structures are disposed on the optical surface, in which each of the optical structures has a first optical active surface and a second optical active surface. The first optical active surface faces toward the light-incident surface, and the second optical active surface faces toward the opposite light-incident surface, in which the first optical active surface and the second optical active surface are inclined towards different directions, and formed in a non-symmetrical shape. A first inclined angle is formed between the first optical active surface and the optical surface, and a second inclined angle is formed between the second optical active surface and the optical surface. The first included angle is greater than the second included angle, and the second included angle is greater than 0 degree, and a first light-emitting angle of the light guide plate decreases exponentially with the first inclined angle. The prism film is disposed in front of the light guide plate.

According to an embodiment of the present invention, the prism film has a plurality of prisms, and each of the prisms has a prism angle facing toward the light guide plate. The light beam emitted from the light guide plate passes through the prisms and is further emitted from the prism film at a second light-emitting angle. The relationship between the prism angle, the first light-emitting angle, and the second light-emitting angle can be expressed as:

$$(\Delta, \varphi, \theta) = n_1 \sin\theta + \frac{n_1}{2}\sin(2\Delta + \varphi) - \frac{n_1}{2}\sin(\Delta - \varphi) + \cos\left(\frac{3\Delta}{2}\right)\sqrt{n_2^2 - n_1^2\cos^2\left(\frac{\Delta}{2} + \varphi\right)} = 0,$$

wherein $\Delta$ is the prism angle, $\varphi$ is the first light-emitting angle, $\theta$ is the second light-emitting angle, $n_1$ is the refractive index of air, and $n_2$ is the refractive index of the prism film.

According to an embodiment of the present invention, the first included angle is smaller than or equal to 10 degrees and is greater than or equal to 2 degrees, and the first included angle is greater than or equal to two times the second included angle.

According to an embodiment of the present invention, the first included angle ranges from twice of the second included angle to smaller than 8 times of the second included angle.

According to an embodiment of the present invention, the prism angle is greater than or equal to 50 degrees and is smaller than or equal to 80 degrees.

According to an embodiment of the present invention, the relationship between the light-emitting angle and the first included angle can be expressed as: $\varphi = A + B \times \text{Exp}(-\alpha/C)$, wherein $\varphi$ is the light-emitting angle, a is the first included angle, and $62 \leq A \leq 65$, $85 \leq B + A \leq 90$, $2 \leq C \leq 3$.

According to the aforementioned object, a display device is provided. The display device includes the aforementioned backlight module and a display panel. The display panel is disposed in front of the light guide plate.

According to the aforementioned embodiments of the present invention, the present invention changes the angles of the optical structures disposed on the light guide plate, thereby increasing the utilization rate of the light beam and the uniformity of light-emitting appearance of the light guide plate. In addition, the angles of the optical structures disposed on the light guide plate are designed to be cooperated with the prism angles of the prism film, thereby effectively guiding the light beam to emit out from the light guide plate in an angle which can be used by the prism film.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
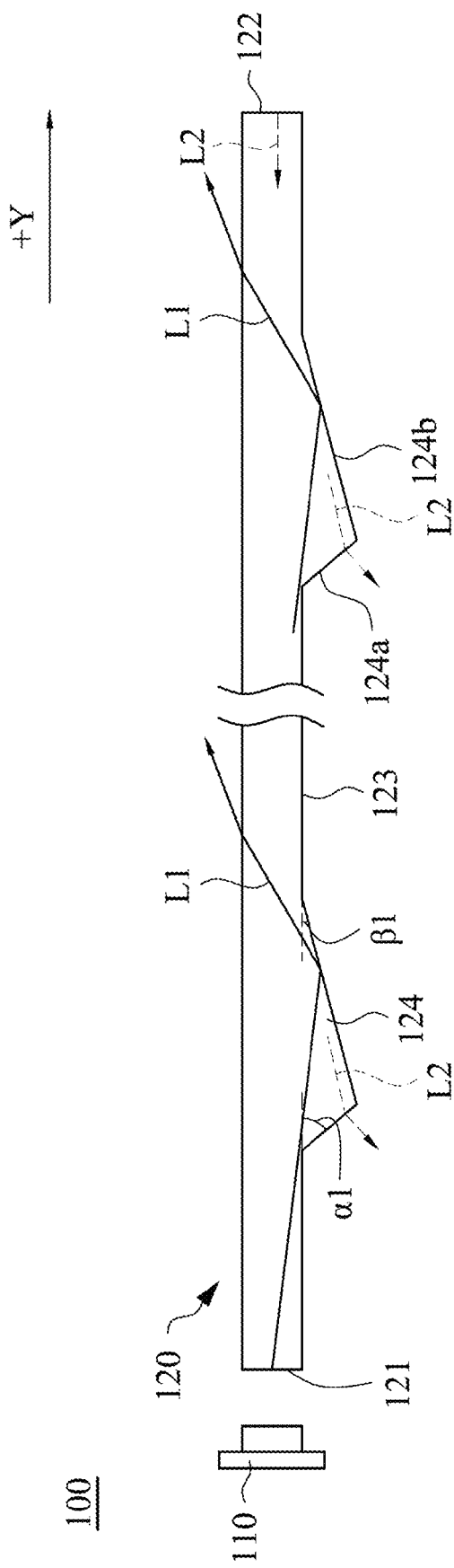
FIG. 1A is a schematic diagram showing a conventional backlight module.
Figure 1B:
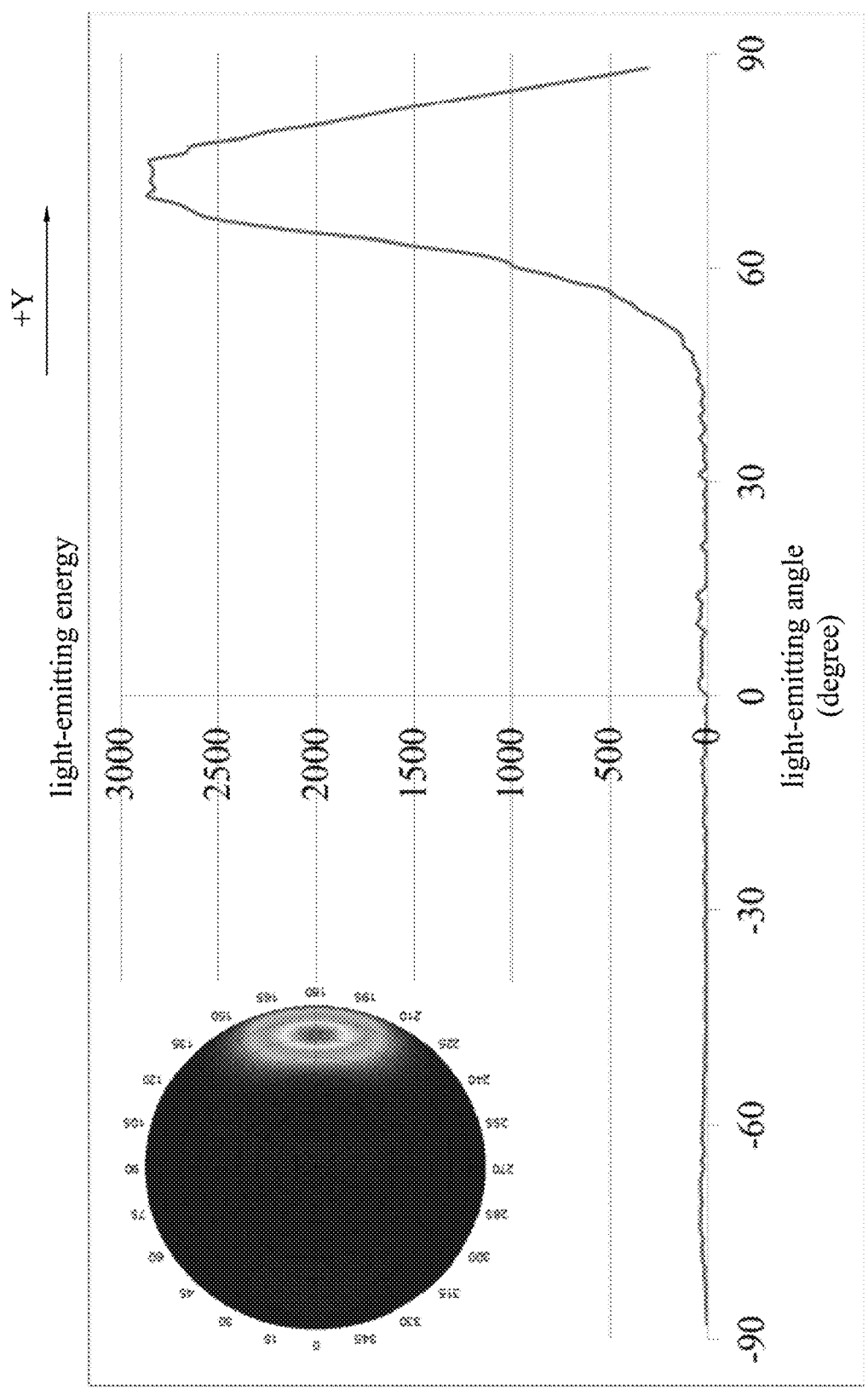
FIG. 1B a schematic diagram showing a relationship between a light-emitting angle and energy generated from the conventional backlight module.

Reference will now be made in detail to the present embodiments of the invention, examples of which are illustrated in the accompanying drawings. Wherever possible, the same reference numbers are used in the drawings and the description to refer to the same or like parts.

Figure 2A:
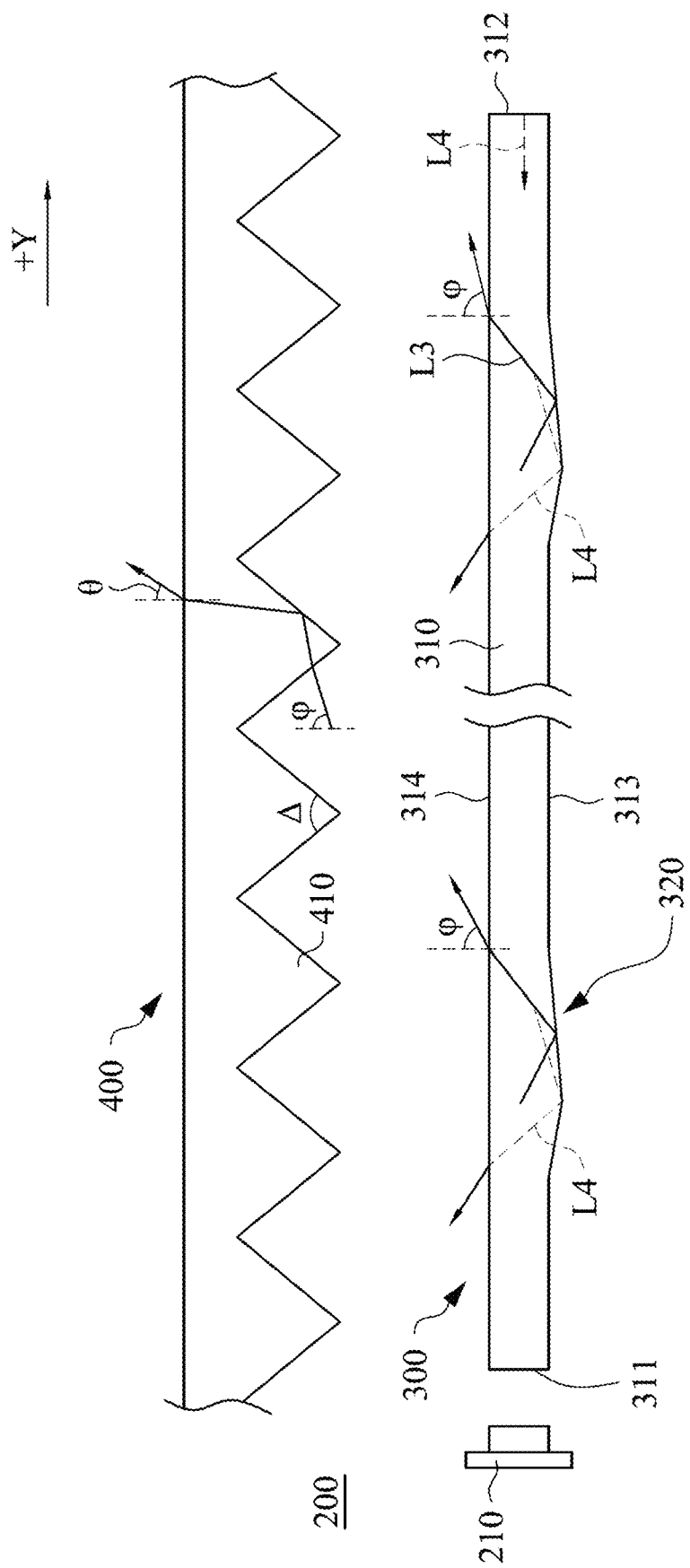
FIG. 2A is a structural diagram showing a backlight module in accordance with an embodiment of the present invention.
Figure 2B:
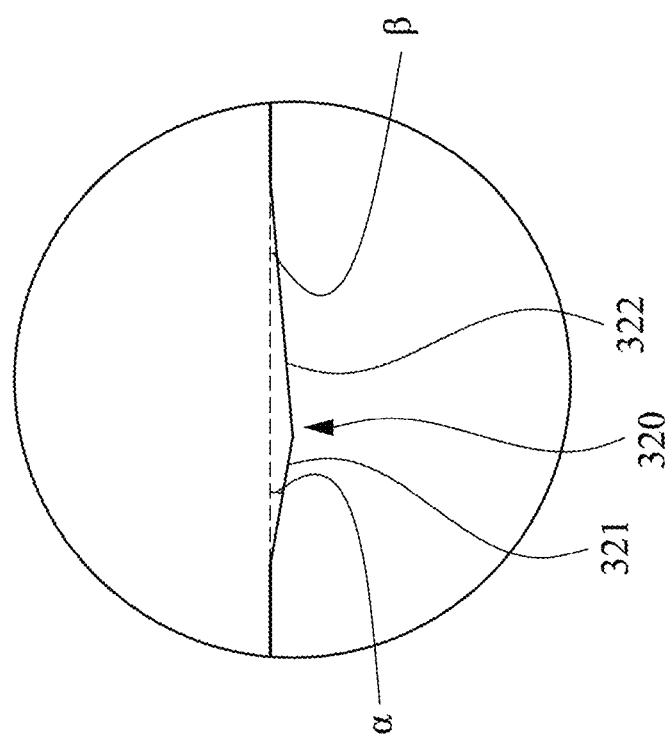
FIG. 2B is a schematic diagram showing an enlarged portion of an optical structure in FIG. 2A.

Referring to FIG. 2A and FIG. 2B, FIG. 2A is a structural diagram showing a backlight module in accordance with an embodiment of the present invention, and FIG. 2B is a schematic diagram showing an enlarged portion of an optical structure in FIG. 2A. The backlight module 200 of the present embodiment mainly includes a light source 210, a light guide plate 300 and a prism film 400. The light guide plate 300 includes a main body 310 and plural optical structures 320. The main body 310 has a light-incident surface 311, an opposite light-incident surface 312, an optical surface 313, and an optical surface 314. The light-incident surface 311 is opposite to the opposite light-incident surface 312, and the optical surface 313 is connected to the light-incident surface 311 and the opposite light-incident surface 312. In one embodiment, the optical surface 313 is a reflecting surface. The optical surface 314 is opposite to the optical surface 313 and is connected to the light-incident surface 311 and the opposite light-incident surface 312. In one embodiment, the optical surface 314 is a light-emitting surface. The light source 210 is disposed adjacent to the light-incident surface 311.

Referring to FIG. 2A and FIG. 2B again, there are plural optical structures 320 disposed on the optical surface 313. Each of the optical structures 320 has a first optical active surface 321 and a second optical active surface 322. The first optical active surface 321 and the second optical active surface 322 are inclined relative to opposite sides and formed in a non-symmetrical shape. The first optical active surface 321 is faced toward the light-incident surface 311 and is inclined relative to the light-incident surface 311, in which a first included angle $\alpha$ is formed between the first optical active surface 321 and the optical surface 313. The second optical active surface 322 is faced toward the opposite light-incident surface 312 and is inclined relative to the light-incident surface 311, in which a second included angle $\beta$ is formed between the second optical active surface 322 and the optical surface 313. The first included angle $\alpha$ is greater than the second included angle $\beta$, and the second included angle $\beta$ is greater than 0 degree.

Figure 3:
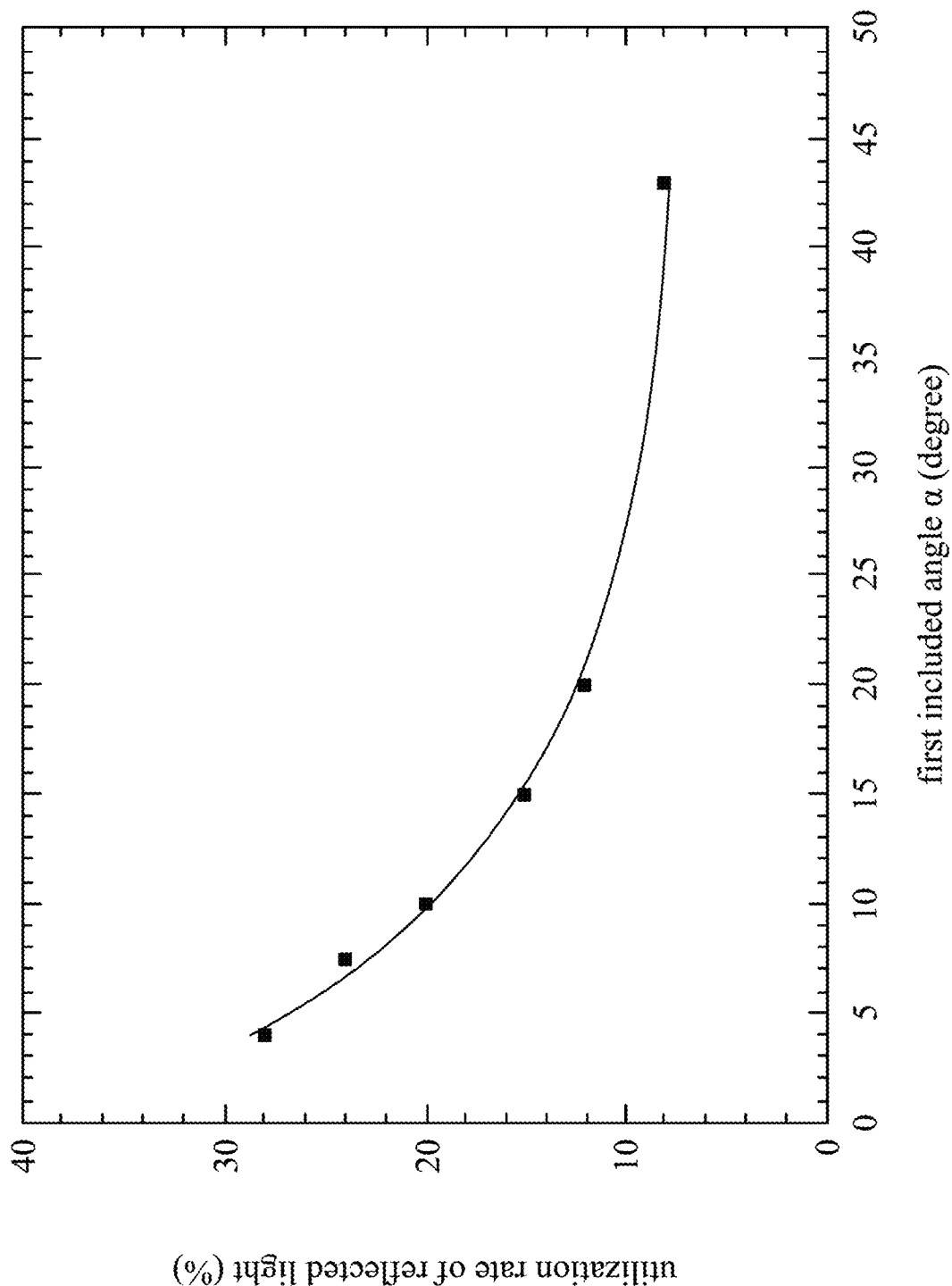
FIG. 3 is a schematic diagram showing a relationship between a first included angle and utilization rate of reflected light.
Figure 4:
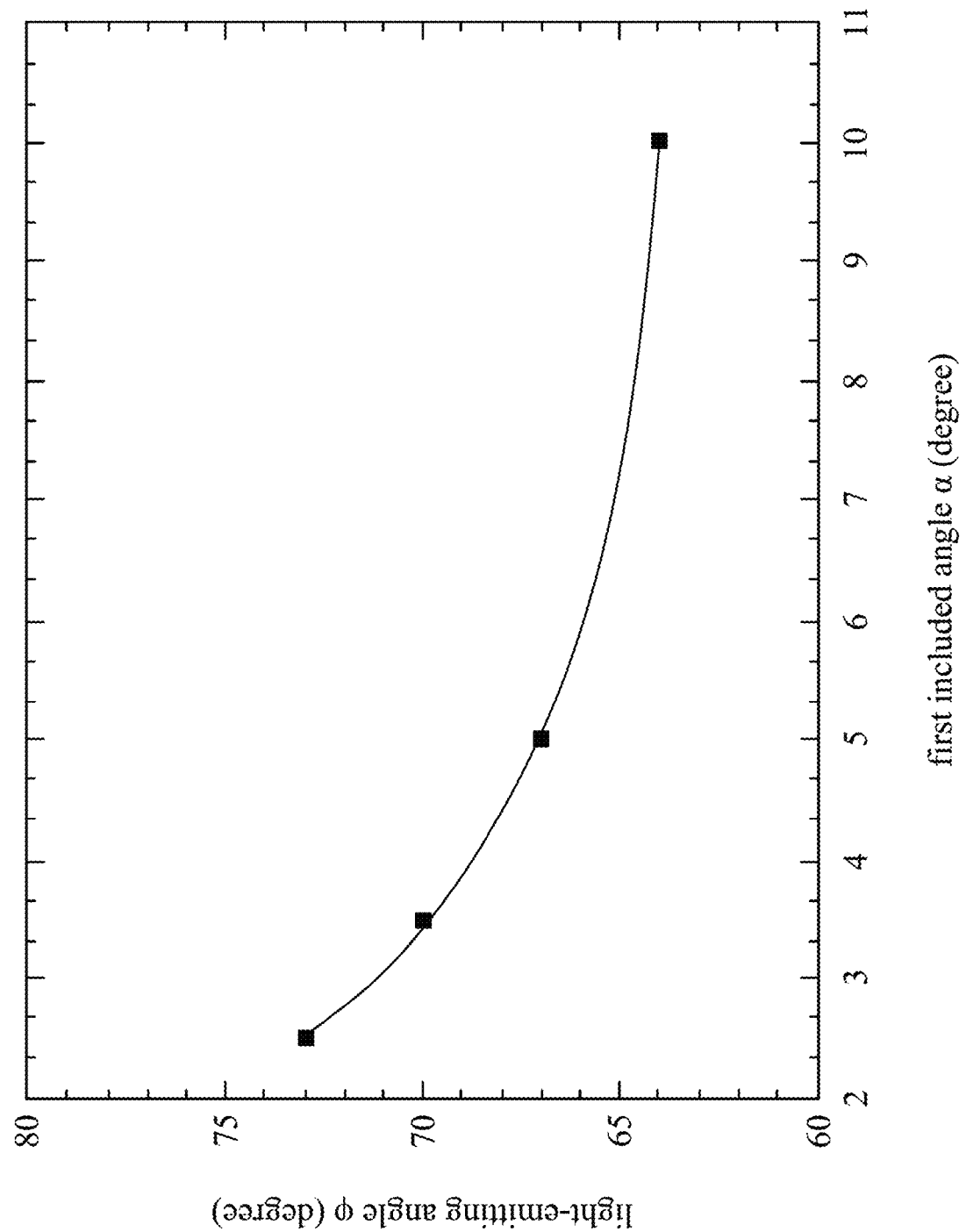
FIG. 4 is a schematic diagram showing a relationship between a first included angle and a light-emitting angle.

Referring to FIG. 2A, FIG. 2B and FIG. 3, FIG. 3 is a schematic diagram showing a relationship between the first included angle and the utilization rate of reflected light. In the present embodiment, the degree of inclination of each the first optical active surface 321 and the second optical active surface 322 can be changed by adjusting the first included angle $\alpha$ and the second included angle $\beta$. As shown in FIG. 3, the smaller the first included angle, the higher utilization rate the light beam reflected by the opposite light-incident surface 312 has. More specifically, when the first included angle $\alpha$ is small, the light beam (e.g. a light beam L4) reflected by the opposite light-incident surface 312 can be further reflected by the first optical active surface 321 and then be emitted from the light-emitting surface (e.g. optical surface 314) of the light guide plate 300, so as to form a concentration light with stronger intensity along $-Y$ direction and can be further used by the prism film 400. Therefore, in the present embodiment, the first included angle $\alpha$ can be designed to be smaller than or equal to 10 degrees and be greater than or equal to 2 degrees, so as to obtain more than 20% utilization of the light beam L4. Moreover, simultaneously referring to FIG. 4, FIG. 4 is a schematic diagram showing a relationship between a first included angle and a light-emitting angle. In the present embodiment, the prism film 400 is a turning film, and a tip of each of the prisms of the prism film 400 faces toward the light guide plate 300, in which the prisms of the prism film 400 are mainly used to receive light with specific light-emitting angles from the light guide plate 300 and further direct the light to emit out from the prism film 400 in a normal direction. When the first included angle $\alpha$ is smaller or equal to 10 degrees and is greater than or equal to 2 degrees, a light-emitting angle (also referred to a first light-emitting angle) $\varphi$ of the light guide plate ranges from about 64 degrees to 73 degrees ($-Y$ direction), such that the light-emitting angle $\varphi$ within this range is an acceptable light incident angle for the prism film 400 to convert an oblique incident light beam into a light beam to emit out from the prism film 400 in a normal direction, and thus after the light beam emitted from the light guide plate 300 passes through the prism film 400, the light beam can be emitted from the prism film 400 in a normal direction. Therefore, by design the first included angle $\alpha$ to a smaller angle enables the light reflected by the first optical active surface 321 to generate light with higher light-emitting angle $\varphi$ and more concentrated viewing angle which can be further used by the prism film 400 to be converted into a positive light, thereby increasing light utilization rate.

Figure 5:
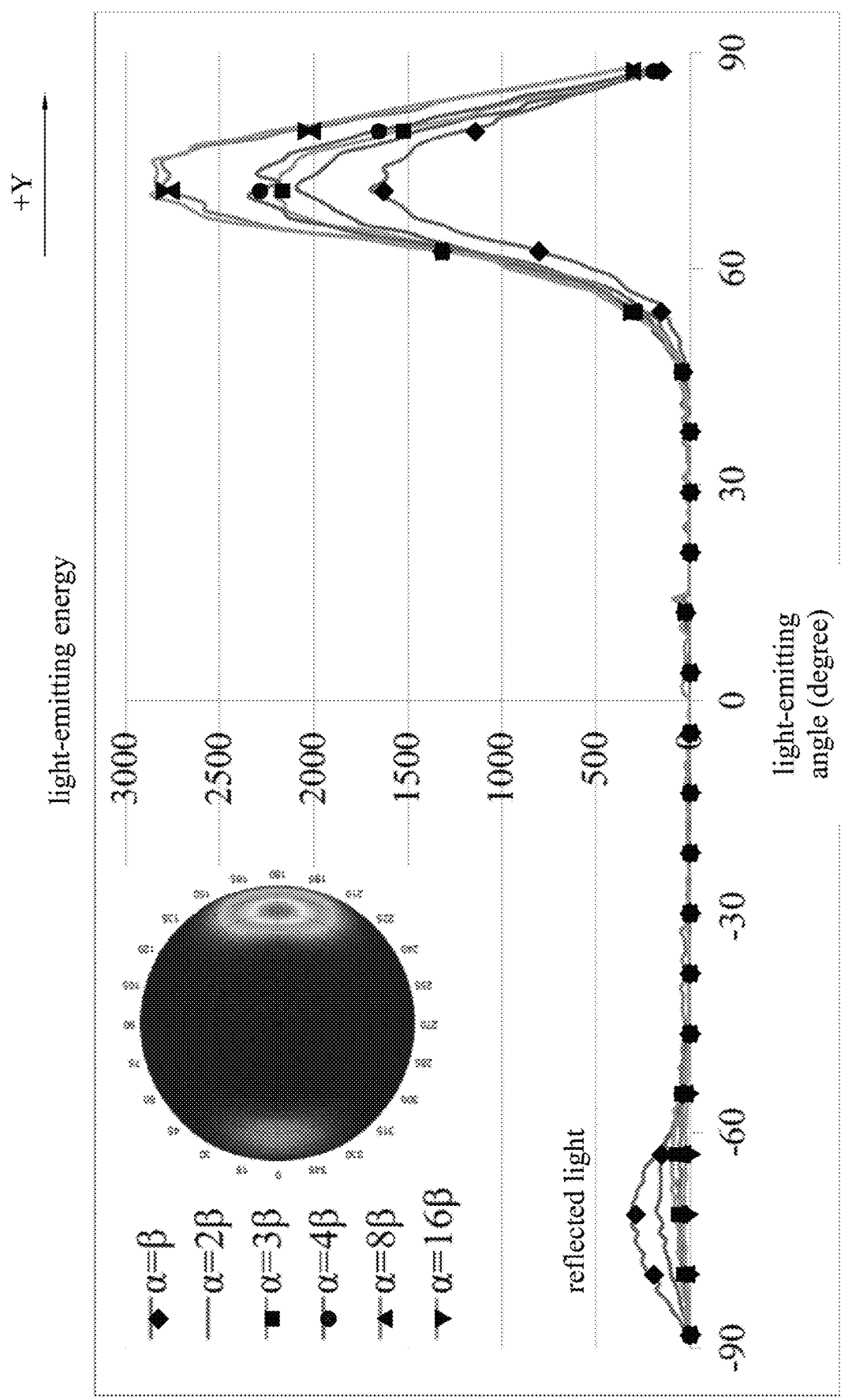
FIG. 5 is a schematic diagram showing a relationship between a light-emitting angle and energy generated from a backlight module in accordance with an embodiment of the present invention.

Simultaneously referring to FIG. 2A, FIG. 2B and FIG. 5, FIG. 5 is a schematic diagram showing a relationship between a light-emitting angle and energy generated from the backlight module 200 in accordance with an embodiment of the present invention. FIG. 5 shows changes of the light-emitting energy versus angular relationships between the first included angle $\alpha$ and the second included angle $\beta$ under the condition that the first included angle $\alpha$ is smaller than or equal to 10 degrees and is greater than or equal to 2 degrees. As shown in FIG. 5, when $\alpha=\beta$, $\alpha=2\beta$, $\alpha=3\beta$, $\alpha=4\beta$, $\alpha=8\beta$, and $\alpha=16\beta$, a portion of light beams emitted from the light source 210 (e.g. a light beam L3 in FIG. 2A) enters the light guide plate 300 and is emitted to and reflected by the second optical active surface 322 of the optical structures 320, and then is emitted from the light-emitting surface (e.g. the optical surface 314) of the light guide plate 300, in which the emitted light with a light-emitting angle of 60-90 degrees (+Y direction) has higher light-emitting energy, and such light-emitting angle is an angle that can be utilized by the prism film 400. Moreover, the light beam reflected by the opposite light-incident surface 312 that is emitted to and reflected by the first optical active surface 321 and then is emitted from the light-emitting surface (e.g. optical surface 314) of the light guide plate 300, also has large amount of and more concentrated light-emitting energy at a light-emitting angle of 60-90 degrees ($-Y$ direction) as shown in FIG. 5, meaning that, under the interaction of by the first optical active surface 321, the light beam reflected by the opposite light-incident surface 312 can be more concentrated and be utilized by the prism film 400.

Figure 6:
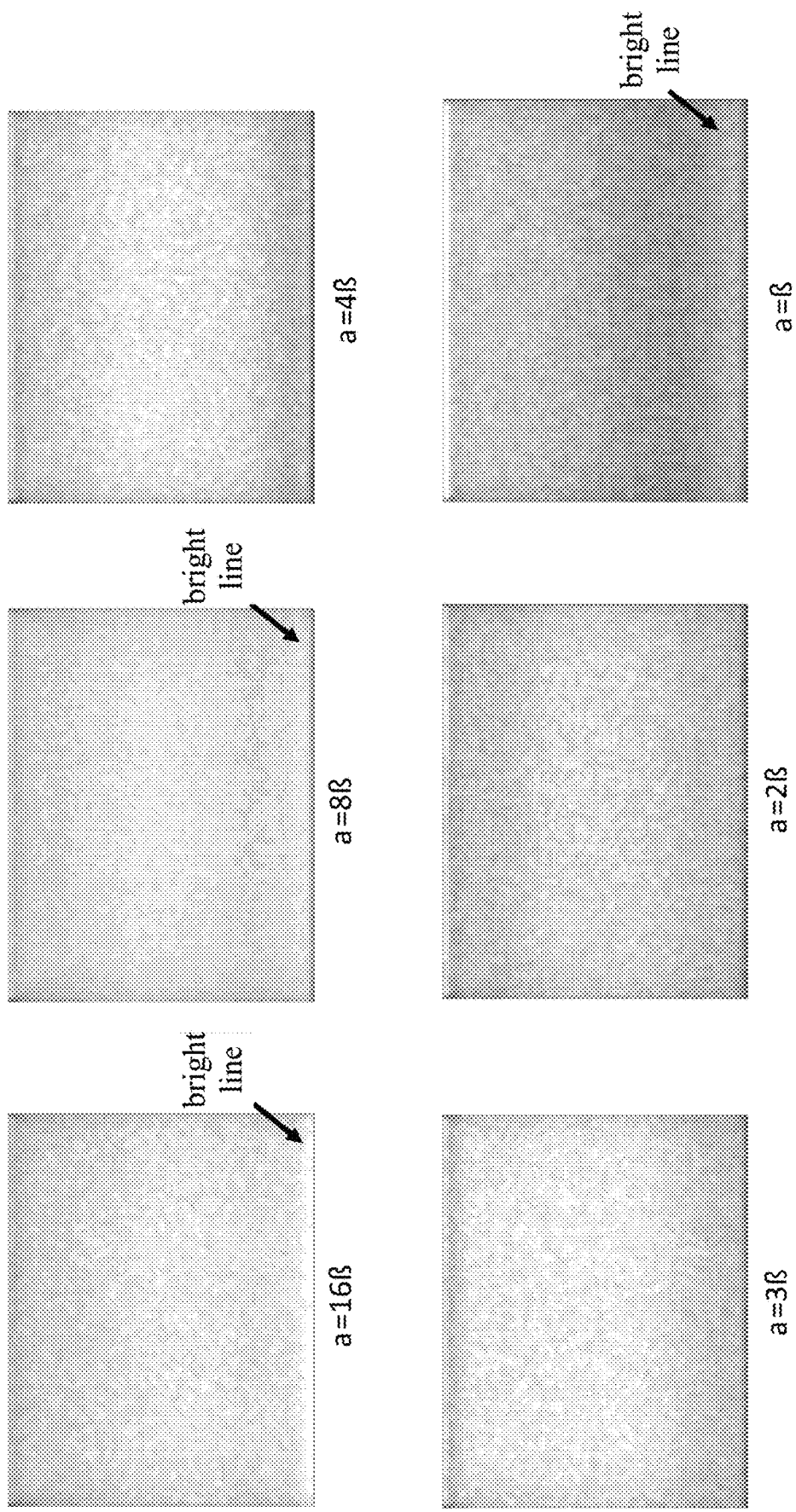
FIG. 6 is a schematic diagram showing different appearances generated by light guide plates with different angular relationships between the first included angle and the second included angle.

Simultaneously referring to FIG. 6, FIG. 6 is a schematic diagram showing different appearances generated by light guide plates with different angular relationships between the first included angle $\alpha$ and the second included angle $\beta$. Under a condition that the first included angle $\alpha$ is smaller than or equal to 10 degrees and is greater than or equal to 2 degrees, when $\alpha=\beta$, $\alpha=2\beta$, $\alpha=3\beta$, $\alpha=4\beta$, $\alpha=8\beta$, and $\alpha=16\beta$, although both the first optical active surface 321 and the second optical active surface 322 can effectively reflect the light beam, the appearances generated by the light guide plate under the conditions of $\alpha=\beta$, $\alpha=8\beta$, and $\alpha=16\beta$ are not uniform. Therefore, in the present embodiment, the angular relationships between the first included angle $\alpha$ and the second included angle $\beta$ should be limited to the range of the first included angle $\alpha$ which is greater than or equal to twice of the second included angle $\beta$ and smaller than 8 times of the second included angle $\beta$.

Based on the foregoing embodiment, the inventors further summarized that the relationship between the light-emitting angle $\varphi$ of the light guide plate 300 and the first included angle $\alpha$ can be expressed as: light-emitting angle $\varphi=A+B\times \mathrm{Exp}(-\alpha/C)$, in which the constants A, B and C in the relationship are defined as follows: $62 \leq A \leq 65$, $85 \leq B+A \leq 90$, and $2 \leq C \leq 3$. In addition, it can also be seen from this relationship that the light-emitting angle $\varphi$ of the light beam derived from the light guide plate 300 is exponentially decreasing with the first included angle $\alpha$.

Figure 7:
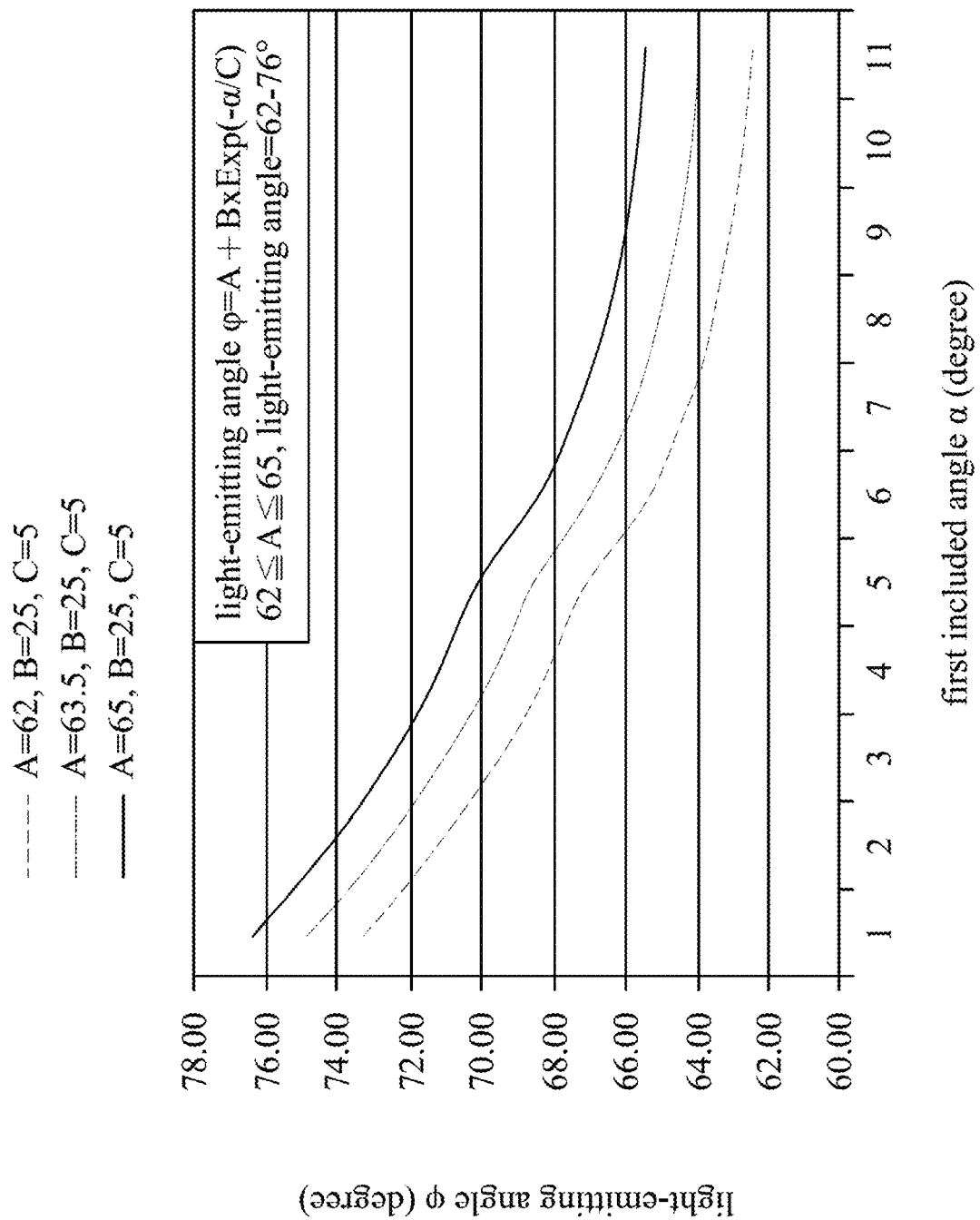
FIG. 7 is a schematic diagram showing a relationship between the first included angle $\alpha$ and a light-emitting angle $\varphi$ of the light guide plate under different A values.

Simultaneously referring to Table 1 and FIG. 7, FIG. 7 is a schematic diagram showing a relationship between the first included angle α and the light-emitting angle φ of the light guide plate under different A values. When 62≤A≤65, the light-emitting angle φ ranges from 62-72 degrees.

TABLE 1 relationship between the first included angle α and the light-emitting angle φ of the light guide plate under different A values.

|  | A = 62, B = 25, C = 5 | A = 63.5, B = 25, C = 5 | A = 65, B = 25, C = 5 |
|---|---|---|---|
| α = 2 | φ = 73.23 | φ = 74.73 | φ = 76.23 |
| α = 2.5 | φ = 71.20 | φ = 72.70 | φ = 74.20 |
| α = 3 | φ = 69.53 | φ = 71.03 | φ = 72.53 |
| α = 3.5 | φ = 68.16 | φ = 69.66 | φ = 71.16 |
| α = 4 | φ = 67.05 | φ = 68.55 | φ = 70.05 |
| α = 5 | φ = 65.38 | φ = 66.88 | φ = 68.38 |
| α = 6 | φ = 64.27 | φ = 65.77 | φ = 67.27 |
| α = 7 | φ = 63.52 | φ = 65.02 | φ = 66.52 |
| α = 8 | φ = 63.02 | φ = 64.52 | φ = 66.02 |
| α = 9 | φ = 62.68 | φ = 64.18 | φ = 65.68 |
| α = 10 | φ = 62.46 | φ = 63.96 | φ = 65.46 |

Figure 8:
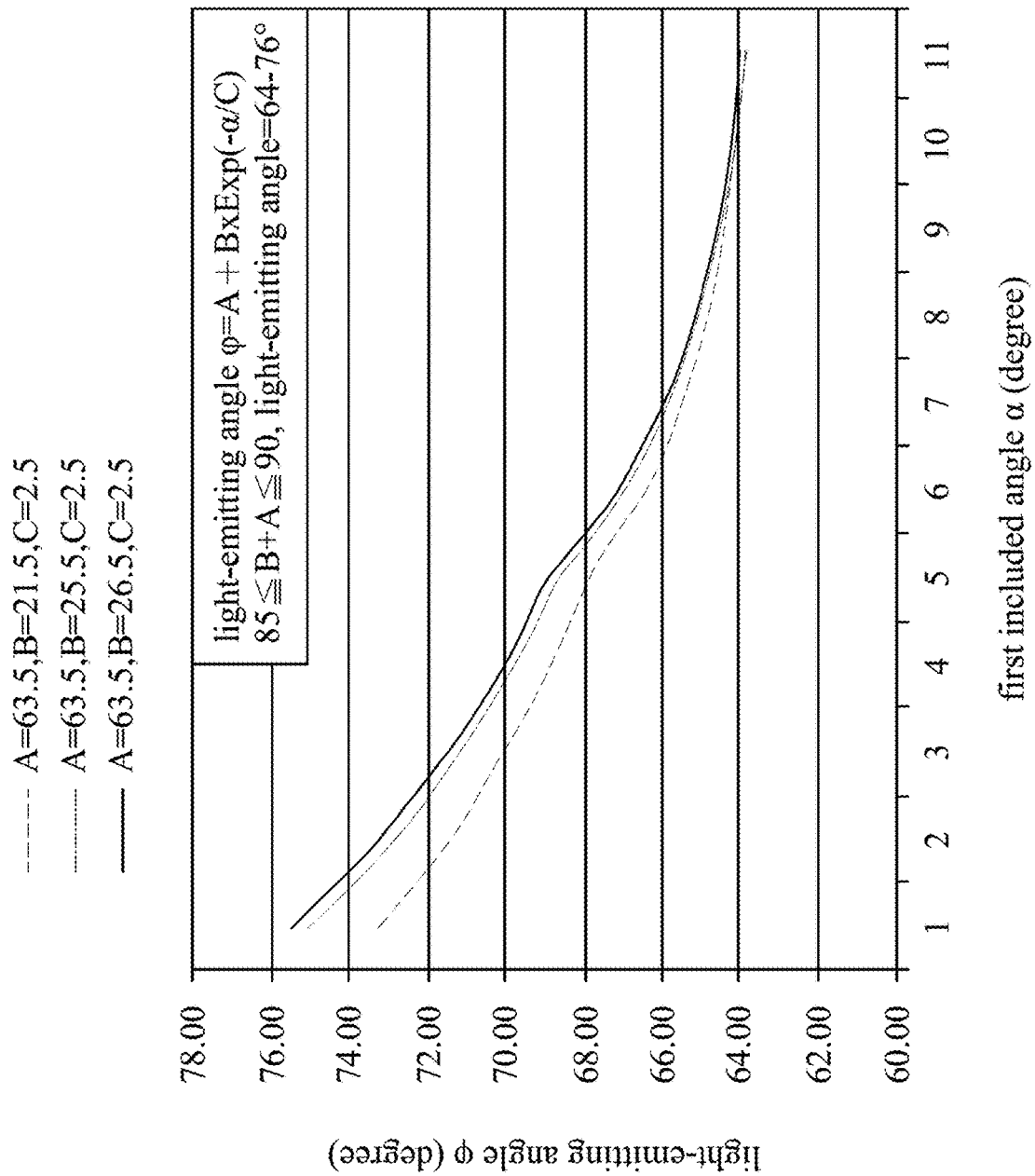
FIG. 8 is a schematic diagram showing a relationship between the first included angle $\alpha$ and the light-emitting angle $\varphi$ of the light guide plate under different B values.

Simultaneously referring to Table 2 and FIG. 8, FIG. 8 is a schematic diagram showing a relationship between the first included angle α and a light-emitting angle φ of the light guide plate under different B values. When 85≤B+A≤90, the light-emitting angle φ ranges from 64-76 degrees.

TABLE 2 relationship between the first included angle α and the light-emitting angle φ of the light guide plate under different B values.

|  | A = 63.5, B = 21.5, C = 2.5 | A = 63.5, B = 25.5, C = 2.5 | A = 63.5, B = 26.5, C = 2.5 |
|---|---|---|---|
| α = 2 | φ = 73.16 | φ = 74.96 | φ = 75.41 |
| α = 2.5 | φ = 71.41 | φ = 72.88 | φ = 73.25 |
| α = 3 | φ = 69.98 | φ = 71.18 | φ = 71.48 |
| α = 3.5 | φ = 68.80 | φ = 69.79 | φ = 70.03 |
| α = 4 | φ = 67.84 | φ = 68.65 | φ = 68.85 |
| α = 5 | φ = 66.41 | φ = 66.95 | φ = 67.09 |
| α = 6 | φ = 65.45 | φ = 65.81 | φ = 65.90 |
| α = 7 | φ = 64.81 | φ = 65.05 | φ = 65.11 |
| α = 8 | φ = 64.38 | φ = 64.54 | φ = 64.58 |
| α = 9 | φ = 64.09 | φ = 64.20 | φ = 64.22 |
| α = 10 | φ = 63.89 | φ = 63.97 | φ = 63.99 |

Figure 9:
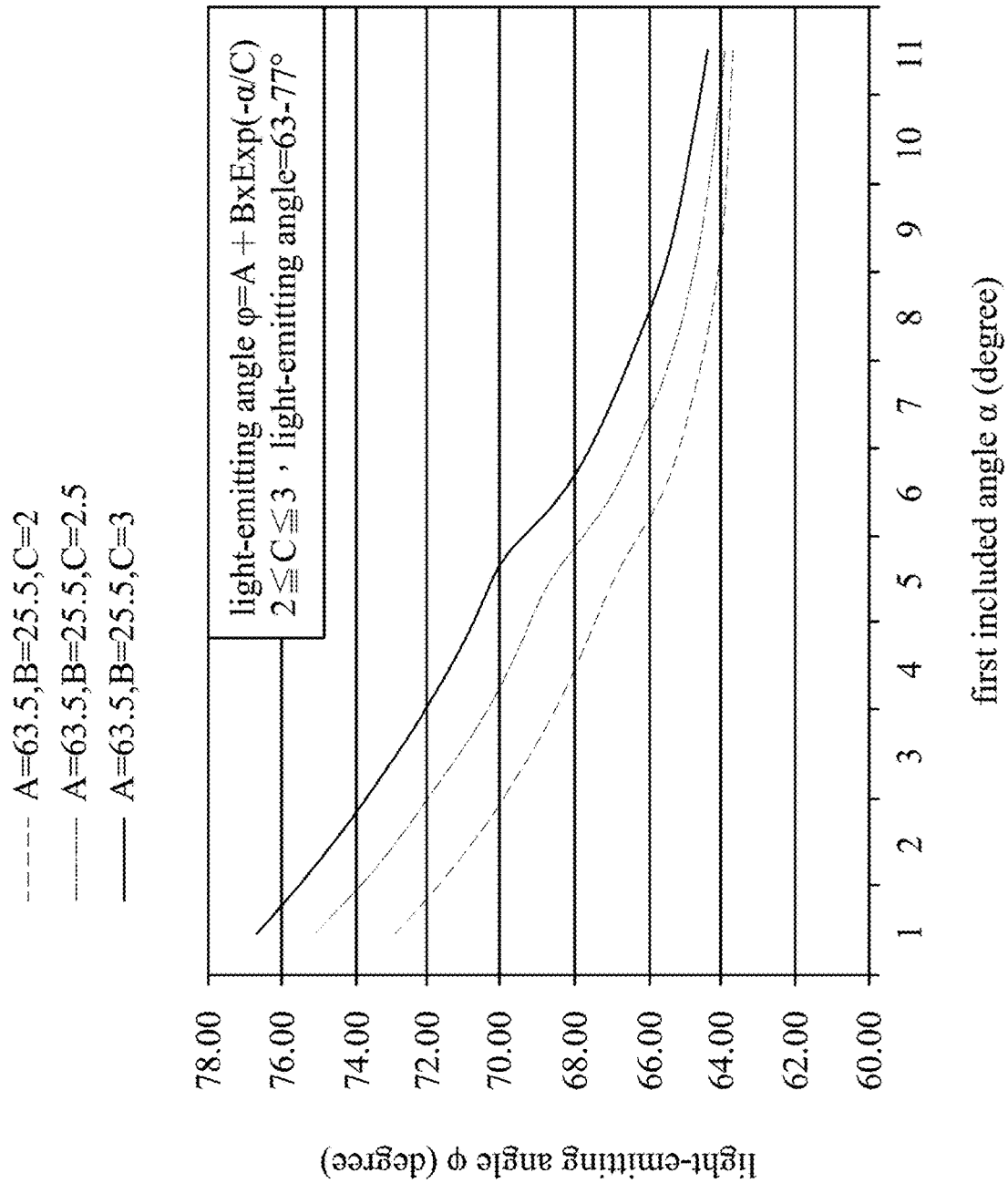
FIG. 9 is a schematic diagram showing a relationship between the first included angle $\alpha$ and the light-emitting angle $\varphi$ of the light guide plate under different C values.

Simultaneously referring to Table 3 and FIG. 9, FIG. 9 is a schematic diagram showing a relationship between the first included angle α and the light-emitting angle φ of the light guide plate under different C values. When 2≤C≤3, the light-emitting angle φ ranges from 63-77 degrees.

TABLE 3 relationship between the first included angle α and a light-emitting angle φ of the light guide plate under different C values.

|  | A = 63.5, B = 25.5, C = 2 | A = 63.5, B = 25.5, C = 2.5 | A = 63.5, B = 25.5, C = 3 |
|---|---|---|---|
| α = 2 | φ = 72.88 | φ = 74.96 | φ = 76.59 |
| α = 2.5 | φ = 70.81 | φ = 72.88 | φ = 74.58 |
| α = 3 | φ = 69.19 | φ = 71.18 | φ = 72.88 |
| α = 3.5 | φ = 67.93 | φ = 69.79 | φ = 71.44 |
| α = 4 | φ = 66.95 | φ = 68.65 | φ = 70.22 |
| α = 5 | φ = 65.59 | φ = 66.95 | φ = 68.32 |
| α = 6 | φ = 64.77 | φ = 65.81 | φ = 66.95 |
| α = 7 | φ = 64.27 | φ = 65.05 | φ = 65.97 |
| α = 8 | φ = 63.97 | φ = 64.54 | φ = 65.27 |
| α = 9 | φ = 63.78 | φ = 64.20 | φ = 64.77 |
| α = 10 | φ = 63.67 | φ = 63.97 | φ = 64.41 |

It can be seen that when the first included angle α is smaller than or equal to 10 degrees and is greater than or equal to 2 degrees, and the first included angle arranges from twice of the second included angle β to smaller than 8 times of the second included angle β, the aforementioned relationship between the first included angle α and the light-emitting angle φ of the light guide plate in the condition of 62≤A≤65, 85≤B+A≤90, and 2≤C≤3 can be used to obtain the light-emitting angle φ of the light guide plate which is about 62-77 degrees. In addition, as shown in FIG. 2A, it is needed to design the angle of prisms 410 on the prism film 400 for guiding the light beam to be emitted at an angle (i.e. light-emitting angle θ) ranging from −30-30 degrees after being emitted from the light guide plate 300 and passes through the prism film 400. In the present embodiment, the relationship between the prism angle Δ of the prism 410, the light-emitting angle φ (i.e. the first light-emitting angle) of the light guide plate 300, and a light-emitting angle (also referred to a second light-emitting angle) θ of the prism film 400 can be expressed as:

$$(\Delta, \varphi, \theta) = n_1 \sin\theta + \frac{n_1}{2}\sin(2\Delta + \varphi) - \frac{n_1}{2}\sin(\Delta - \varphi) + \cos\left(\frac{3\Delta}{2}\right)\sqrt{n_2^2 - n_1^2\cos^2\left(\frac{\Delta}{2} + \varphi\right)} = 0,$$

in which $n_1$ is the refractive index of air, and $n_2$ is the refractive index of the prism film.

Figure 10:
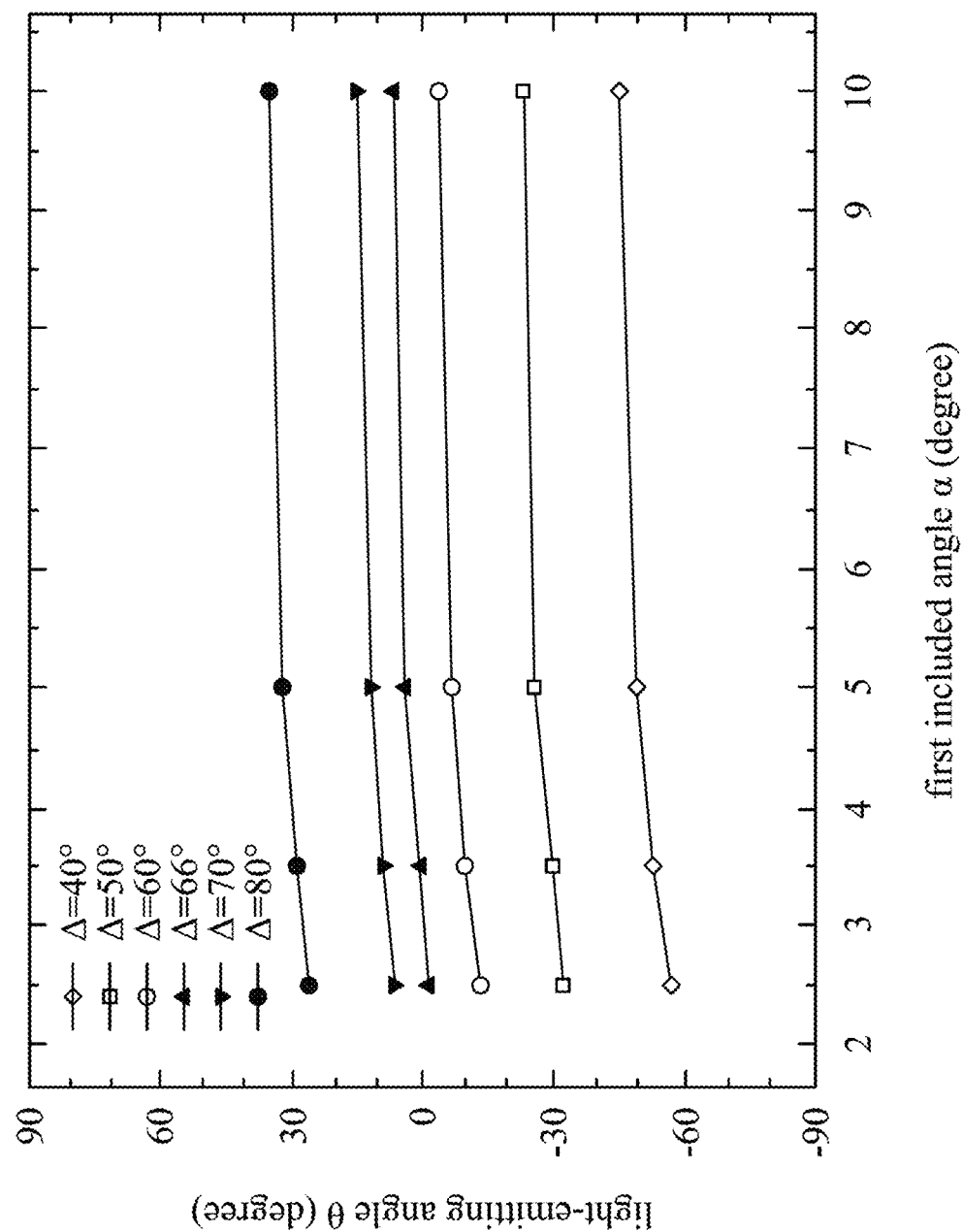
FIG. 10 is a schematic diagram showing a relationship between the first included angle $\alpha$ and a light-emitting angle $\theta$ of a prism film under different prism angles $\Delta$.

Referring to FIG. 10, FIG. 10 is a schematic diagram showing a relationship between the first included angle α and a light-emitting angle θ of a prism film under different prism angles Δ. As shown in FIG. 10, when the prism angle Δ is 50 degrees, 60 degrees, 66 degrees, 70 degrees, or 80 degrees, the light-emitting angle θ of the prism film 400 ranges from −30-30 degrees which meets the requirement of an acceptable viewing angle direction which is close to a normal direction. In addition, it can be known from FIG. 10 that when the first included angle α is smaller than or equal to 10 degrees and is greater than or equal to 2 degrees, the change of the first included angle α does not affect the light-emitting angle θ of the prism film 400. However, when the prism angle Δ is 40 degrees, the light-emitting angle θ is −60 degrees which does not meet the requirement of the acceptable viewing angle. Therefore, the prism angle Δ should be limited to be greater than or equal to 50 degrees and smaller than or equal to 80 degrees.

Figure 11:
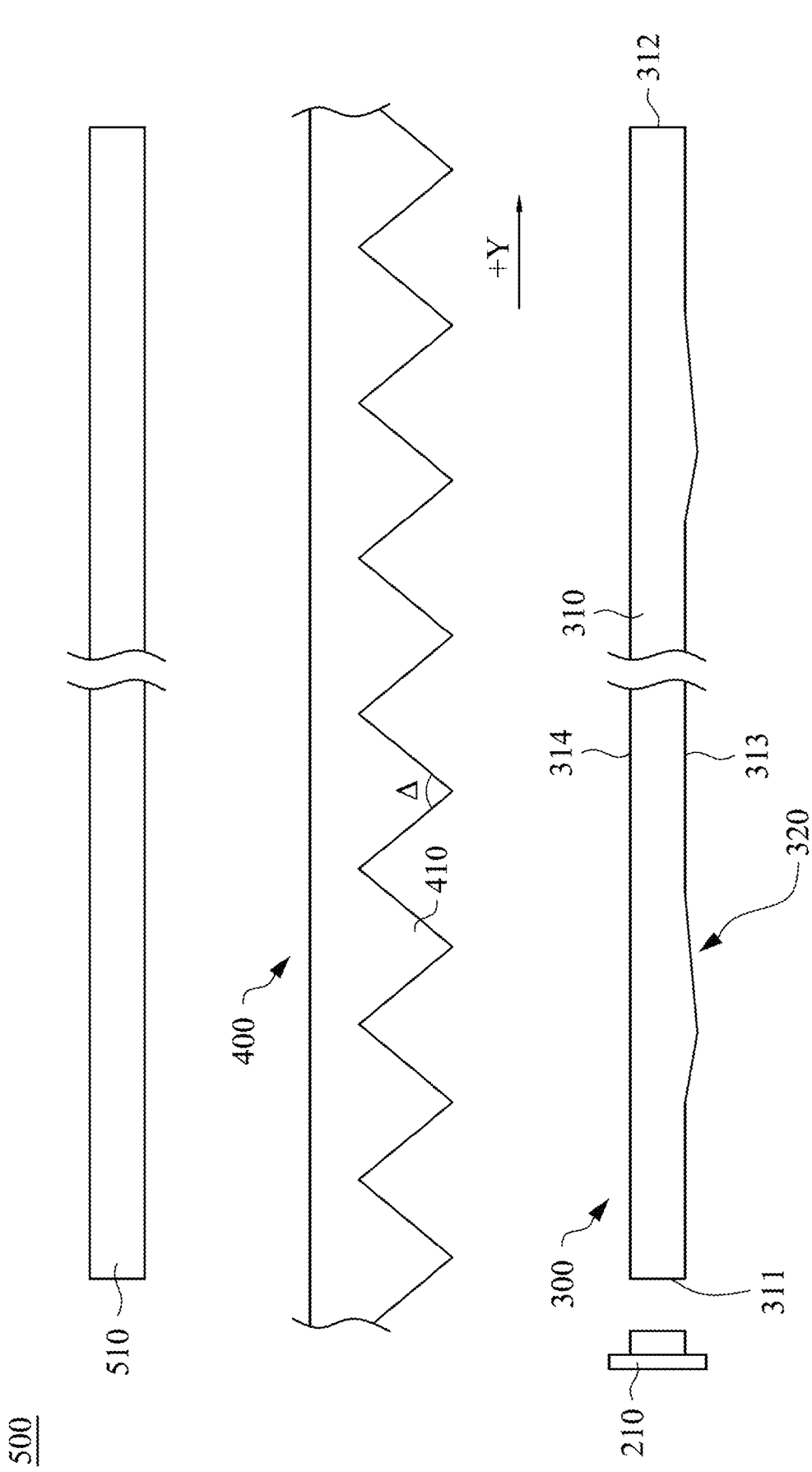
FIG. 11 is a structural diagram showing a display device in accordance with an embodiment of the present invention.

Referring to FIG. 11, FIG. 11 is a structural diagram showing a display device 500 in accordance with an embodiment of the present invention. The display device 500 of the present embodiment includes the backlight module 200 as shown in FIG. 2A and a display panel 510. As shown in FIG. 11, the display panel 510 is disposed on a light-emitting side of the light guide plate 300. The utilization rate of the reflecting light reflected by the opposite light-incident surface 312 in the display device 500 can be increased by the optical structures 320 of the light guide plate 300.

According to the aforementioned embodiments of the present invention, the present invention changes the angles of the optical structures disposed on the light guide plate, thereby increasing the utilization rate of the light beam and the uniformity of light-emitting appearance of the light guide plate. In addition, the angles of the optical structures disposed on the light guide plate are designed to be cooperated with the prism angles of the prism film, thereby effectively guiding the light beam to emit out from the light guide plate in an angle which can be used by the prism film.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising a light source, a light guide plate and a prism film, wherein the light guide plate is suitable to guide light beam generated from the light source, and the light guide plate comprises:
a main body having a light-incident surface, an opposite light-incident surface, and an optical surface, wherein the light-incident surface is opposite to the opposite light-incident surface, and the optical surface is connected to the light-incident surface and the opposite light-incident surface, and the light-incident surface faces toward the light source; and
a plurality of optical structures disposed on the optical surface, wherein each of the optical structures has a first optical active surface and a second optical active surface, and the first optical active surface faces toward the light-incident surface, and the second optical active surface faces toward the opposite light-incident surface, wherein the first optical active surface and the second optical active surface are inclined towards different directions, and formed a non-symmetrical shape, and a first inclined angle is formed between the first optical active surface and the optical surface, and a second inclined angle is formed between the second optical active surface and the optical surface;
wherein the prism film is disposed in front of the light guide plate and has a plurality of prisms;
wherein each of the prisms has a prism angle facing toward the light guide plate;
wherein the first included angle is greater than the second included angle, and the second included angle is greater than 0 degree, and a light-emitting angle of the light guide plate decreases exponentially with the first inclined angle;
wherein a portion of the light beam propagates to the opposite light-incident surface and is reflected by the opposite light-incident surface to propagate toward the light-incident surface so that the light beam reflected by the opposite light-incident surface can be further reflected by the first optical active surface and then be emitted from the light-emitting surface of the light guide plate to be used by the prism film;
wherein the first included angle is smaller than or equal to 10 degrees and is greater than or equal to 2 degrees.

2. The backlight module of claim 1, wherein the first included angle of the light guide plate is greater than or equal to twice of the second included angle.

3. The backlight module of claim 2, wherein the first included angle is in a range which is greater than or equal to twice of the second included angle and smaller than 8 times of the second included angle.

4. A backlight module, comprising a light source, a light guide plate and a prism film, wherein the light guide plate is suitable to guide light beam generated from the light source, and the light guide plate comprises:
a main body having a light-incident surface, an opposite light-incident surface, and an optical surface, wherein the light-incident surface is opposite to the opposite light-incident surface, and the optical surface is connected to the light-incident surface and the opposite light-incident surface, and the light-incident surface faces toward the light source; and
a plurality of optical structures disposed on the optical surface, wherein each of the optical structures has a first optical active surface and a second optical active surface, and the first optical active surface faces toward the light-incident surface, and the second optical active surface faces toward the opposite light-incident surface, wherein the first optical active surface and the second optical active surface are inclined towards different directions, and formed a non-symmetrical shape, and a first inclined angle is formed between the first optical active surface and the optical surface, and a second inclined angle is formed between the second optical active surface and the optical surface; and
wherein the prism film is disposed in front of the light guide plate and has a plurality of prisms;
wherein each of the prisms has a prism angle facing toward the light guide plate;
wherein the first included angle is greater than the second included angle, and the second included angle is greater than 0 degree, and a light-emitting angle of the light guide plate decreases exponentially with the first inclined angle;
wherein a portion of the light beam propagates to the opposite light-incident surface and is reflected by the opposite light-incident surface to propagate toward the light-incident surface so that the light beam reflected by the opposite light-incident surface can be further reflected by the first optical active surface and then be emitted from the light-emitting surface of the light guide plate to be used by the prism film;
wherein the relationship between the light-emitting angle and the first included angle can be expressed as:

$$\varphi = A + B \times \mathrm{Exp}(-\alpha/C),$$

wherein $\varphi$ is the light-emitting angle, $\alpha$ is the first included angle, and $62 \leq A \leq 65$, $85 \leq B+A \leq 90$, $2 \leq C \leq 3$.

5. The backlight module of claim 4, wherein the light beam emitted from the light guide plate passes through the prisms and is further emitted from the prism film at a second light-emitting angle, wherein the relationship between the prism angle, the first light-emitting angle, and the second light-emitting angle can be expressed as:

$$(\Delta, \varphi, \theta) = n_1 \sin\theta + \frac{n_1}{2}\sin(2\Delta + \varphi) -$$
$$\frac{n_1}{2}\sin(\Delta - \varphi) + \cos\left(\frac{3\Delta}{2}\right)\sqrt{n_2^2 - n_1^2\cos^2\left(\frac{\Delta}{2} + \varphi\right)} = 0,$$

wherein $\Delta$ is the prism angle, $\varphi$ is the first light-emitting angle, $\theta$ is the second light-emitting angle, $n_1$ is the refractive index of air, and $n_2$ is the refractive index of the prism film.

6. The backlight module of claim 4, wherein the first included angle is smaller than or equal to 10 degrees and is greater than or equal to 2 degrees, and the first included angle is greater than or equal to twice of the second included angle.

7. The backlight module of claim 6, wherein the first included angle is in a range which is greater than or equal to twice of the second included angle and smaller than 8 times of the second included angle.

8. The backlight module of claim 4, wherein the prism angle is greater than or equal to 50 degrees and is smaller than or equal to 80 degrees.

9. A display device, comprising:
a backlight module of claim 1; and
a display panel disposed in front of the light guide plate.

10. The backlight module of claim 1, wherein the prism angle is greater than or equal to 50 degrees and is smaller than or equal to 80 degrees.

11. The backlight module of claim 1, wherein the light beam emitted from the light guide plate passes through the prisms and is further emitted from the prism film at a second light-emitting angle, wherein the relationship between the prism angle, the first light-emitting angle, and the second light-emitting angle can be expressed as:

$$(\Delta, \varphi, \theta) = n_1 \sin\theta + \frac{n_1}{2}\sin(2\Delta + \varphi) - \frac{n_1}{2}\sin(\Delta - \varphi) + \cos\left(\frac{3\Delta}{2}\right)\sqrt{n_2^2 - n_1^2\cos^2\left(\frac{\Delta}{2} + \varphi\right)} = 0,$$

wherein $\Delta$ is the prism angle, $\varphi$ is the first light-emitting angle, $\theta$ is the second light-emitting angle, $n_1$ is the refractive index of air, and $n_2$ is the refractive index of the prism film.

12. A display device, comprising:
a backlight module of claim 4; and
a display panel disposed in front of the light guide plate.

* * * * *